Sept. 5, 1967 W. PECHMANN 3,339,595
APPARATUS FOR TRANSFERRING MEASURED QUANTITIES OF
PULVERULENT MATERIAL
Filed Aug. 15, 1963 4 Sheets-Sheet 1

INVENTOR:
WILHELM PECHMANN
BY
Michael J. Striker
his ATTORNEY

Sept. 5, 1967 W. PECHMANN 3,339,595
APPARATUS FOR TRANSFERRING MEASURED QUANTITIES OF
PULVERULENT MATERIAL
Filed Aug. 15, 1963 4 Sheets-Sheet 4

Fig. 8

INVENTOR:
WILHELM PECHMANN
BY
Michael S. Striker
his ATTORNEY

United States Patent Office 3,339,595
Patented Sept. 5, 1967

3,339,595
APPARATUS FOR TRANSFERRING MEASURED QUANTITIES OF PULVERULENT MATERIAL
Wilhelm Pechmann, Burscheid, Germany, assignor to H. Strunck & Co., Cologne-Ehrenfeld, Germany
Filed Aug. 15, 1963, Ser. No. 302,273
Claims priority, application Germany, Aug. 16, 1962, St 19,596
11 Claims. (Cl. 141—44)

The present invention relates to an apparatus for transferring measured quantities of pulverulent, granular or other forms of comminuted material. More particularly, the invention relates to a filling apparatus which serves to simultaneously receive, to thereupon simultaneously transfer and to thereupon simultaneously discharge two or more batches of accurately measured pulverulent material.

It is an important object of my invention to provide a filling apparatus which can transfer measured quantities of pulverulent or like comminuted material at short intervals and which is constructed and assembled in such a way that it may receive new quantities of material while it discharges measured quantities of material which were received in the preceding step so that the intervals between consecutive deliveries of measured material are reduced to a minimum.

Another object of the invention is to provide an apparatus of the just outlined characteristics which can be readily converted for transfer of different quantities of comminuted material and which is capable of transferring in a single step several batches of such material whereby the quantity of material in one or more batches is either different from or the same as the quantity of material in the remaining batches.

A further object of the invention is to provide a filling apparatus wherein the mechanism for regulating the quantities of material which are being transferred from a source to the point of delivery is accessible at all times so that such adjustments may be made without necessitating dismantling of the remaining component parts.

An additional object of the invention is to provide a filling apparatus wherein the batches of measured pulverulent or like material may be held against the force of gravity all the way from the source of such material and to the point of discharge so that there can be no spillage while the measured quantities of such material move to the discharging station.

Still another object of the invention is to provide a novel control arrangement for use in a filling or transferring apparatus of the above outlined characteristics.

A further object of the invention is to provide a novel suction generating and pressure generating system for use in the filling apparatus of the above outlined characteristics, and to provide special funnels which insure satisfactory transfer of measured batches of solid material directly into two or more bottles, jars, cans or other types of containers.

Still another object of the invention is to provide a fully automatic processing plant wherein one or more filling apparatus of the above outlined characteristics cooperate with automatic washing, drying and sterilizing machines as well as with automatic capping or sealing machines so that bottles or other types of containers are washed, dried, sterilized, filled, capped and thereupon stored or stacked in a fully automatic way.

A concomitant object of the invention is to provide a special rotor which may be used in the filling apparatus of the above outlined type and to provide special means for regulating the capacity of measuring chambers in the rotor so that the apparatus may be rapidly converted for transfer of larger or smaller batches of comminuted solid material.

With the above objects in view, one feature of my invention resides in the provision of a filling apparatus which serves to receive pulverulent material at a filling station, for example, through the underside of a hopper, magazine or a similar source, and to deliver measured quantities of such material at an evacuating station. The apparatus comprises a rotor which is oscillatable about a fixed axis and which is preferably formed with at least two axially parallel rows or groups of radially extending material receiving and measuring chambers and with a cutout or another form of internal space which is sealed from the inner ends of the chambers and which may but need not extend to the peripheral surface of the rotor. A hand wheel or a power-operated drive serves to move the rotor between a plurality of angularly spaced positions in one of which the open outer ends of one group of chambers are adjacent to and may receive measured quantities of pulverulent material from the magazine while the chambers of the other group discharge their contents at the evacuating station and in another of which the chambers of the one group are located at the evacuating station while the chambers of the other group receive material from the magazine. The apparatus further comprises one or more distributor valves, a suction generating device which may communicate with the chambers through such valve or valves while the chambers receive and advance the material toward the evacuating station, and a source of compressed gas which communicates with the chambers through such valve or valves when the chambers are ready to discharge the material at the evacuating station.

The space provided in the rotor of my filling apparatus enables an operator to regulate the capacity of each measuring chamber by changing the position of suitable filters which are provided in the chambers and which determine the extent to which the chambers may be filled with pulverulent material.

The novel features which are considered as characteristic of the invention are set forth in particular in the appended claims. The improved filling apparatus itself, however, both as to its construction and its method of operation, together with additional features and advantages thereof, will be best understood from the following detailed description of certain specific embodiments with reference to the accompanying drawings, in which:

FIG. 3c illustrates the valve in a third position which corresponds to that of FIG. 3a;

Figure 1:
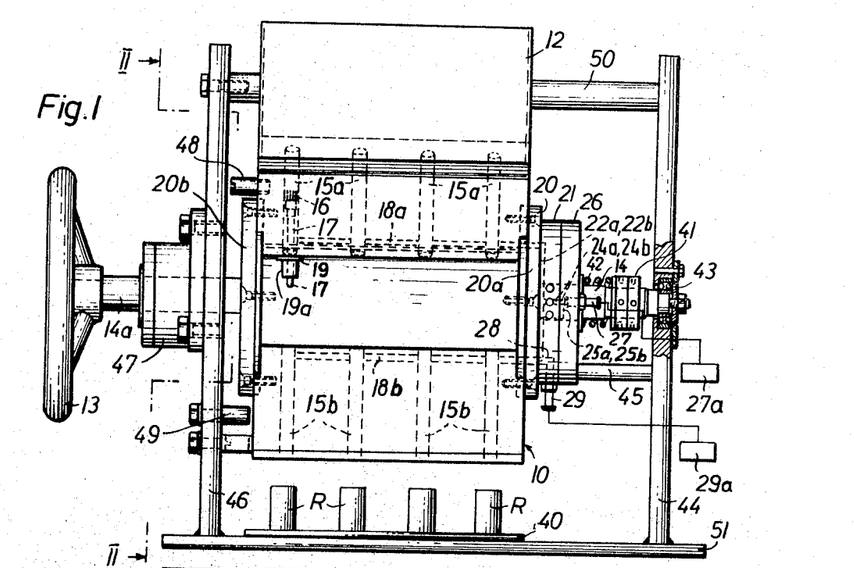
FIG. 1 is a side elevational view of a filling apparatus which embodies one form of my invention, a portion of the frame being broken away to illustrate the mounting of a shaft which is coupled to the oscillatable rotor.
Figure 2:
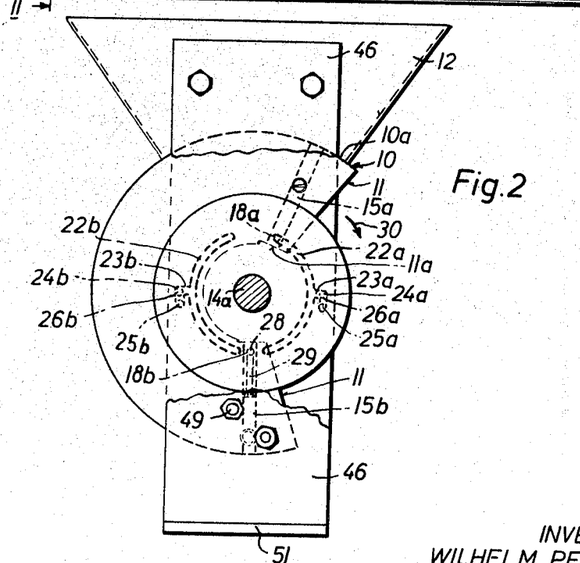
FIG. 2 is a transverse vertical section as seen in the direction of arrows from the line II—II of FIG. 1.

Referring to FIGS. 1 and 2, there is shown a filling apparatus which is utilized for collecting, transferring and discharging measured quantities of pulverulent material. This apparatus comprises a rotor 10 here shown as an arcuate segment provided with an internal space in the form of a composite cutout including a sector-shaped peripheral section 11 and an axially extending inner section 11a which latter surrounds the axis of the rotor. The rotor 10 is arranged to rotate about the axis of a horizontal shaft 14 and is located beneath a source of pulverulent material here shown as a magazine or hopper 12 whose underside is open so that the material contained in the magazine may descend by gravity. This open underside of the magazine 12 is normally sealed by the peripheral surface 10a of the rotor 10. The latter is arranged to revolve with the shaft 14 which is rotatable by a drive means here shown as a hand wheel 13. It goes without saying that the hand wheel 13 may be replaced by any suitable power-operated drive mechanism such as a motor or the like, not shown.

In the embodiment of FIGS. 1 and 2, the rotor 10 is provided with two rows or groups of radially extending cylindrical measuring chambers 15a, 15b and each of these rows is parallel with the axis of the shaft 14. It will be noted that the row of chambers 15a is adjacent to the one and that the row of chambers 15b is adjacent to the other axially extending edge of the peripheral surface 10a bounding the rotor 10, i.e., that the chambers 15a, 15b are located at the opposite sides of the section 11. The angle enclosed by the planes of the rows of chambers 15a, 15b is less than 180 degrees. The inner ends of the chambers 15a, 15b terminate at the section 11a. Intermediate its ends, each of these chambers accommodates an air-permeable filter or screen 16 (only one shown) which serves to prevent pulverulent material from passing inwardly and from escaping through the inner ends of the chambers. In other words, the position of the filters 16 determines the quantity of pulverulent material which may accumulate in each of the chambers 15a when the rotor 10 is moved to the position of FIG. 1 or 2. In the illustrated embodiment, the filters 16 assume the form of cylindrical brushes whose bristles are sufficiently close to each other to prevent penetration of pulverulent material into the section 11a. Each brush 16 is carried by a radially extending threaded spindle 17 which projects into the cutout section 11a and which carries an adjustable sealing washer 19 serving to seal the inner end of the respective chamber 15a or 15b so that neither air nor pulverulent material can flow from the one to the other axial end of a chamber or vice versa. In FIGS. 1 and 2, each chamber 15a or 15b is bounded at its innermost end by a threaded surface whose threads mesh with the threads of the respective spindle 17 so that these spindles may be adjusted radially of the rotor 10 in order to change the volume of the material-receiving outer portion of the respective chamber. This will be readily understood since the brushes 16 are connected with the respective spindles 17 so that any axial displacement of a selected spindle will cause the respective brush to move nearer to or further away from the peripheral surface 10a. The sealing washers 19 are provided with nuts in the form of sleeves 19a whose internal threads mesh with the threads of the respective spindles to make sure that each washer will be movable into sealing engagement with the surface bounding the cutout section 11a. In addition, the washers 19 and their sleeves 19a serve as lock nuts to hold the spindles 17 in selected axial positions when the washers engage the surface surrounding the cutout section 11a. It is to be understood that the brushes 16 may be replaced by other types of screens or filters, such as layers of felt, sinter metal or any other suitable air-permeable substance.

The inner end portions of the chambers 15a communicate with an axially extending duct 18a which is machined into the material of the rotor 10 and which extends all the way to the right-hand end face 20 of this rotor, reference being had to FIG. 1. The points of communication between the duct 18a and the chambers 15a are located between the brushes 16 and the respective washers 19. A similar duct 18b communicates with the inner end portions of the chambers 15b and also extends to the right-hand end face 20 of the rotor 10. It will be noted that streams of gaseous fluid flowing through the ducts 18a, 18b may penetrate through the brushes 16 toward the outer ends of the chambers 15a, 15b or vice versa, depending upon whether the apparatus of my invention is momentarily operated with a gaseous fluid at subatmospheric or superatmospheric pressure.

The right-hand end face 20 of the rotor 10 is actually the outer end face of a disk 20a which is rigidly secured to and which is coaxial with the rotor 10 so that it may be considered to constitute a component part of this rotor. The end face 20 of this disk 20a is in sealing abutment with a ring-shaped distributor valve 21 which is supported by the shaft 14 but does not share all angular movements of the rotor. The end face of the valve 21 which is turned toward the disk 20a of the rotor 10 is formed with two substantially semicircular channels 22a, 22b whose distance from the axis of the shaft 14 is the same as that of the ducts 18a, 18b. Thus, when the rotor 10 is caused to rotate about the axis of the shaft 14, the right-hand ends of the ducts 18a, 18b will communicate with the channel 22a or 22b. The width of the channels 22a, 22b approximates or equals the diameter of the duct 18a or 18b, and those channels are respectively in communication with radially outwardly extending channels 23a, 23b which extend to bores 24a, 24b. Those bores extend axially of and to the right-hand end face of the valve 21, as viewed in FIG. 1, and may communicate with comparatively short arcuate channels 25a, 25b provided in the left-hand end face of a second ring-shaped valve 26 which is sealingly pressed against the right-hand end face of the valve 21. The valve 26 is also mounted on the shaft 14, and it will be noted that the distance between the channels 25a, 25b and the axis of the shaft 14 is the same as the distance between the axis of this shaft and the centers of the bores 24a, 24b. The second valve 26 is formed with axial bores 26a, 26b which respectively communicate with the channels 25a, 25b and which also communicate with a suction conduit 27 leading to a suction fan 27a or to another suction generating device.

The lower portion of the valve 21 is formed with an axially and radially extending bore 28 which communicates with a pressure conduit 29 leading to an air compressor 29a or a similar source of another suitable compressed gaseous fluid. The bore 28 is located in or close to the lowermost point of the circle which is common to the channels 22a, 22b and to the ducts 18a, 18b. When the apparatus of my invention is in actual use, the bore 28 will travel in a small arc but will always remain at the same distance from the axis of the shaft 14. This will be described in greater detail hereinafter. It is to be noted that the bore 28 does not communicate with the channels 22a, 22b.

Figure 3A:
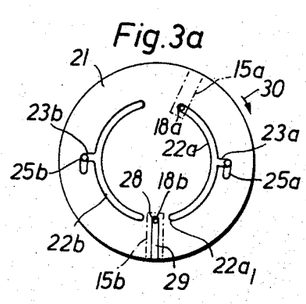
FIG. 3a illustrates a first position of a ring-shaped distributor valve which constitutes one element of the apparatus shown in FIGS. 1 and 2.

The filling apparatus of FIGS. 1 and 2 operates as follows:

When the outer ends of the chambers 15a are located beneath the underside of the magazine 12, suction prevailing in these chambers cooperates with the force of gravity to cause entry of pulverulent material all the way down to the respective brushes 16 so that each chamber contains a measured quantity of such material. At the same time, the chambers 15b are in communication with the source of compressed fluid 29a so that the material contained therein is evacuated in a fully automatic way by gravity flow and by compressed fluid to enter a series of containers R shown in FIG. 1. FIG. 3a shows that the bore 28 is located in its lowermost position and communicates with the duct 18b of the rotor 10 whenever the chambers 15b assume the discharging or evacuating position of FIG. 1 or 2. It is normally sufficient to send into the duct 18b a single blast of compressed air or another gaseous fluid in order to expel all particles of pulverulent material from each of the chambers 15b. At the same time, the chambers 15a are in a position to receive a new supply of material from the magazine 12, see also FIG. 3a. The channel 22a communicates with the channel 23a and with the channel 25a so that suction prevails in the zones beneath the brushes 16 in the chambers 15a, and such suction will assist the force of gravity in filling the outer portions of these chambers all the way from the peripheral surface 10a and inwardly to the brushes 16.

Figure 3B:
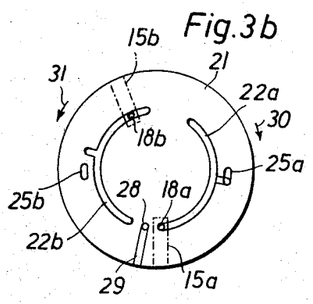
FIG. 3b illustrates this ring-shaped valve in a second angular position which it assumes upon a slight displacement in a clockwise direction.

As soon as the chambers 15b are evacuated and as soon as each of the chambers 15a receives a measured quantity of pulverulent material, the operator turns the rotor 10 in the direction indicated in FIGS. 2 and 3a by an arrow 30 so as to move the chambers 15a to the position of FIG. 3b in which the axes of these chambers are vertical and in which the outer end of each of these chambers is located above a new container R, not shown in FIG. 3b. The apparatus of my invention cooperates with a suitable conveyor 40 which advances the containers R in stepwise fashion so that a new container is located beneath the rotor 10 whenever a row of chambers is ready to discharge its contents. The open outer ends of the chambers 15b (which are empty) are now located beneath the open side of the magazine 12 so that they receive measured quantities of pulverulent material in a fully automatic way partly due to gravity flow and partly due to the action of suction which is effective through the duct 18b and channel 22b.

Of course, while the row of chambers 15a moves from the position of FIG. 3a to the position of FIG. 3b, the duct 18a remains in communication with the suction generating device 27a via channel 22a to make sure that these chambers retain their charges up to the very moment when their outer ends move above the respective receptacles so that no spilling will take place while the outer ends of the filled chambers 15a are exposed and while these chambers travel in an arc toward the positions of FIG. 3b. This is due to the fact that the open end of the duct 18a travels with the rotor 10 along the channel 22a so that suction prevailing in the duct 18a prevents discharge of pulverulent material even when the outer ends of the chambers 15a travel beneath a horizontal plane which passes through the axis of the shaft 14. The valve 21 participates in a portion of such angular movement of the rotor 10 (arrow 30), namely, the valve 21 travels through a distance which approximates the length of the channel 25a in the second valve 26 or which approximates the distance between the bore 28 and the adjacent end portions 22a₁, 22b₁ of the channels 22a, 22b. As explained hereinabove, the bore 28 is located in its lowermost position whenever the chambers 15b assume the positions shown in FIGS. 1, 2 and 3a. However, since the bore 28 is provided in the valve 21, it moves with this valve and assumes the position of FIG. 3b which means that the chambers 15a remain connected with the suction generating device 27a but are sealed from the bore 28.

Figure 3C:
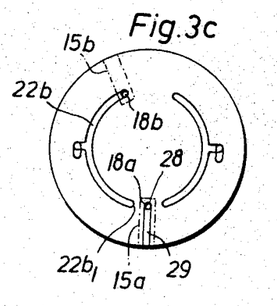

The valve 21 is then rotated either by hand or by remote control to move in the opposite direction (arrow 31) through a distance which approximates the length of a channel 25a or 25b whereby the bore 28 moves to the position of FIG. 3c and sends a blast of compressed air or another gaseous fluid into the duct 18a so that the material contained in the chambers 15a is evacuated in a fully automatic way. Since the duct 18b is in permanent communication with the chambers 15b, the material which now fills these chambers is held by suction. As far as the valve 21 is concerned, its position shown in FIG. 3c corresponds to that shown in FIG. 3a. The width of the open underside of the magazine 12 is such that the outer ends of the chambers 15b communicate with the interior of the magazine at one side of a vertical plane passing through the axis of the shaft 14 (see FIGS. 3b and 3c), and that the chambers 15a communicate with the interior of this magazine at the other side of such vertical plane (FIGS. 2, 3a, 3d).

Figure 3D:
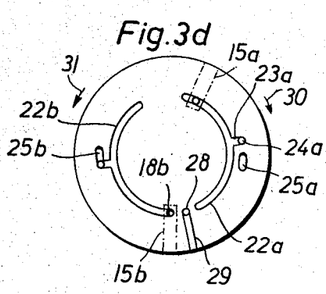
FIG. 3d illustrates the valve in a fourth position which corresponds to that of FIG. 3b.

In the next step, the operator rotates the rotor 10 in a counterclockwise direction (arrow 31) so as to move the chambers 15a, 15b into the position of FIG. 3d. The valve 21 shares a portion of such angular movement and shifts its bore 28 from the latter's lowermost position so that the bore 28 is out of communication with the duct 18b but the channel 22a communicates with the chambers 15a. Owing to the fact that the chambers 15b (which are now filled with pulverulent material) remain in communication with the suction generating device 27a via channel 22b, there is no spillage of material while the chambers 15b travel between the positions of FIGS. 3c and 3d. In the next following step, the operator rotates the valve 21 in a clockwise direction (arrow 30) through a distance approximating the length of the channel 25a so that the pressure generating device 29a communicates with the duct 18b and sends a blast of compressed gaseous fluid which evacuates the material from the chambers 15b.

It is clear that the valve 21 may be moved angularly in different stages of the operation as long as such angular displacements of the valve 21 take place before the duct 18a reaches the leading portion 22a₁ of the channel 22a in the position of FIG. 3a and before the duct 18b reaches the leading portion 22b₁ of the channel 22b in the position of FIG. 3c to make sure that the chambers 15a, 15b remain in communication with the suction generating device 27a all the way from the underside of the magazine 12 and to the position of registry with the respective containers R.

The shaft 14 carries an axially adjustable stop 41 which serves to limit the expansion of a helical spring 42 acting against the right-hand end face of the second valve 26 and serving to bias the valve 21 into sealing engagement with the disk 20a. The rightmost end of the shaft 14 is mounted in bearings 43 provided in an upright frame member 44. This frame member 44 carries a horizontal arresting member 45 which extends through the valve 26 and into a suitable recess of the valve 21 to limit angular movements of this valve 21 in the above described manner. In other words, certain angular displacements of the valve 21 are caused by friction between its left-hand end face and the right-hand end face of the disk 20a, and the remaining angular adjustments of the valve 21 may be effected manually or by remote control. A second frame member 46 carries a second shaft 14a which is coaxial with the shaft 14 and which is connected with the hand wheel 13. This second shaft 14a is mounted in bearings 47 provided on the frame member 46 and is drivingly connected with a second disk 20b which constitutes a component part of and is secured to the main body portion of the rotor 10. The rotor carries a stud 48 which cooperates with a similar stud 49 carried by the frame member 46 to limit the extent of oscillatory movements of the rotor. The upper ends of the frame members 44, 46 support a crosshead 50 which carries the magazine 12, and the lower ends of these frame members are mounted on a base plate 51.

The operator can immediately sense when the valve 21 has completed its movement from the position of FIG. 3a to that of FIG. 3b or from the position of FIG. 3c to that of FIG. 3d because the resistance to rotation of the rotor 10 increases substantially when the arresting member 45 prevents further rotation of the valve 21.

The cutout 11, 11a enables an operator to reach into the interior of the rotor 10 and to adjust the position of the spindles 17 without necessitating even partial dismantling of the apparatus. At least a portion of the conduitry which connects the valve 21 with the source compressed fluid 29a is flexible so that the valve 21 is free to turn with respect to the member 45. In the apparatus of FIG. 1, the conduit 27 may but need not comprise one or more flexible sections.

It will be readily understood that the ducts 18a, 18b may extend to the left-hand end face of the disk 20b and that the apparatus may comprise a further distributor valve which is then mounted on the shaft 14a to connect the ducts 18a, 18b with a second source of compressed air or with a second suction generating device, especially if it is desired to maintain the chambers 15a, 15b at very low pressure while these chambers receive and transfer measured quantities of pulverulent material.

Figure 4:
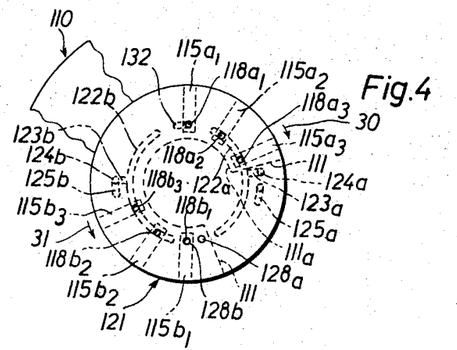
FIG. 4 illustrates a different ring-shaped valve which is used in a modified filling apparatus wherein the rotor is provided with six groups of material receiving chambers.

FIG. 4 illustrates a modified distributor valve 121 which cooperates with a different rotor 110 having a cutout 111, 111a and six rows of material receiving chambers $115a_1$, $115a_2$, $115a_3$, $115b_1$, $115b_2$, $115b_3$. The chambers $115a_1$–$115a_3$ form a first series of parallel rows of chambers, and the chambers $115b_1$–$115b_3$ form a second series of rows which is angularly spaced from the first series. The rotor is further provided with six axially extending ducts $118a_1$, $118a_2$, $118a_3$, $118b_1$, $118b_2$, $118b_3$ each of which communicates with the respective row of chambers. The valve 121 is analogous to the valve 21 and is formed with channels 122a, 122b, 123a, 123b and 124a, 124b. The broken-line channels 125a, 125b are provided in a valve which corresponds to the valve 26 of FIGS. 1 and 2 and which is not shown in FIG. 4. The valve 121 is further formed with two bores 128a, 128b which are connected to the source of compressed gaseous fluid and which are respectively arranged to deliver blasts of compressed fluid to the chambers $115a_1$–$115a_3$ and $115b_1$–$115b_3$. In addition, the valve 121 is formed with a short arcuate channel 132 arranged to connect with the vacuum generating device that row of chambers which is momentarily in the position occupied in FIG. 4 by the chambers $115a_1$. The channel 132 at the filling station is necessary to insure that the suction generating device is connected only with that row of measuring chambers which receive solid material from the magazine. Otherwise, the construction of the apparatus which utilizes the arrangement of FIG. 4 is the same as that of the previously described apparatus.

When the row of chambers $115a_1$ is being filled, the row of chambers $115b_1$ discharges its contents into the respective containers. In the next step, the chambers $115a_2$ are filled while the blast of compressed fluid admitted through the duct $118b_2$ evacuates measured quantities of material from the chambers $115b_2$, etc. When all of the chambers $115a_1$–$115a_3$ are filled, the operator rotates the rotor 110 in the direction indicated by the arrow 30 to move the row of chambers $115a_3$ into requisite position for evacuation of their contents whereby the chambers $115b_3$ assume the positions occupied in FIG. 4 by the chambers $115a_1$. In the next step, the chambers $115b_2$ are moved to the top of the valve 121 (arrow 30) while the chambers $115a_2$ are being evacuated and, in the next following step, the filling of chambers $115b_1$ takes place while the blast of compressed fluid delivered through the duct $118a_1$ evacuates the contents of the chambers $115a_1$. The valve 121 is rotated in the direction indicated by the arrow 30 when the chambers $115a_1$–$115a_3$ evacuate their contents, and this valve is rotated in the opposite direction (arrow 31) when the chambers $115b_1$–$115b_3$ evacuate their contents. The bore 128a supplies compressed fluid to the chambers $115a_1$–$115a_3$, and the bore 128b supplies compressed fluid to the chambers $115b_1$–$115b_3$. The channels 122a, 122b oscillate back and forth with the valve 121 so that they connect with the suction generating device that row of chambers which is momentarily filled with pulverulent material while such filled chambers travel toward the evacuating station and to disconnect from the suction generating device all such chambers which are momentarily empty and which are not located beneath the source of pulverulent material. This is of considerable advantage because suction in that row of chambers which receives material from the magazine would be very weak if one or more additional rows of empty chambers would be connected with the suction generating device. In FIG. 4, the rows of chambers $115a_2$, $115a_3$ are not connected with the suction generating device because the channel 122a does not communicate with the channel 125a. The chambers $115a_1$ communicate with the suction generating device through the channel 132. The chambers $115b_2$, $115b_3$ are filled with pulverulent material and are connected with the channel 122b which communciates with the suction generating device via channel 125b. Thus, in addition to the channels 125a, 125b, the channel 132 is also permanently connected with the suction generating device and, while the channels 125a, 125b serve to connect with the suction generating device such chambers which travel toward the evacuating station, the channel 132 serves to connect with the suction generating device only one row of chambers at a time, i.e., only that row which is being filled with solid material.

Figure 5:
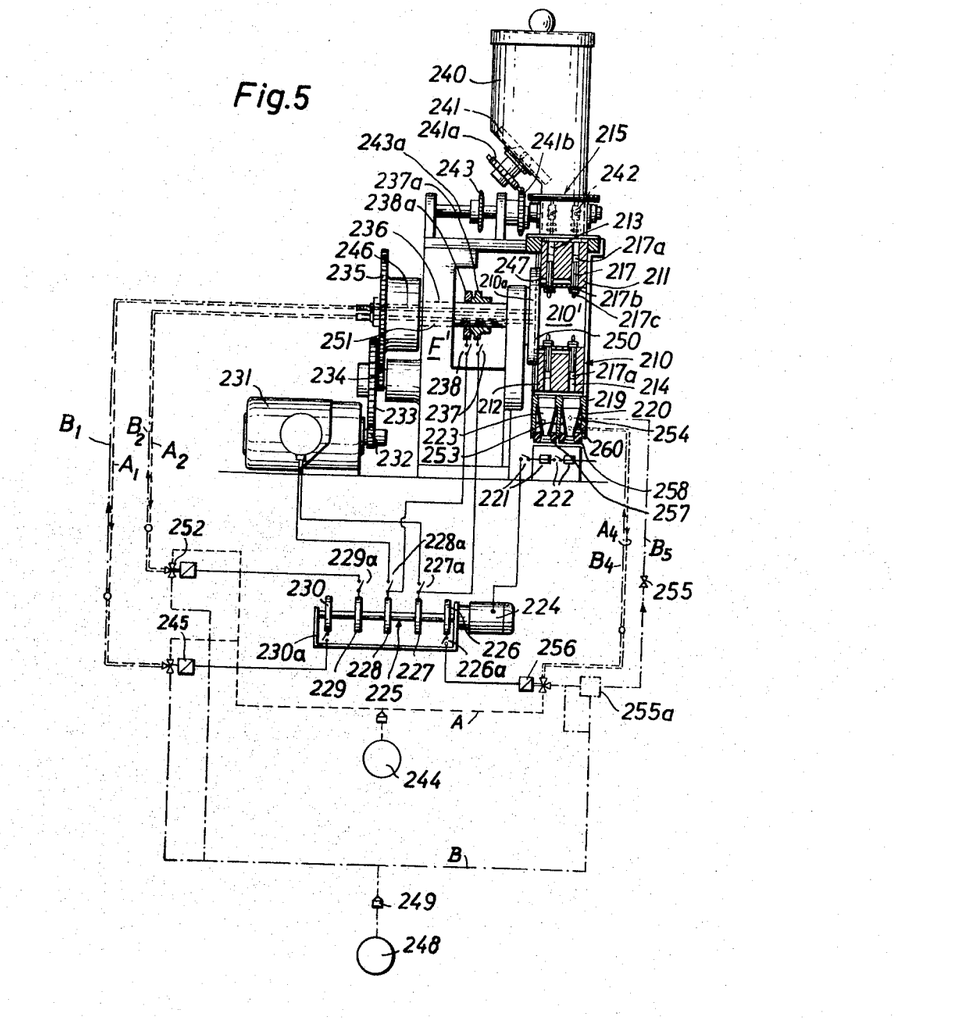
FIG. 5 is a diagrammatic side elevational view of a third filling apparatus whose hollow cylindrical rotor is shown in axial section.
Figures 6, 7:
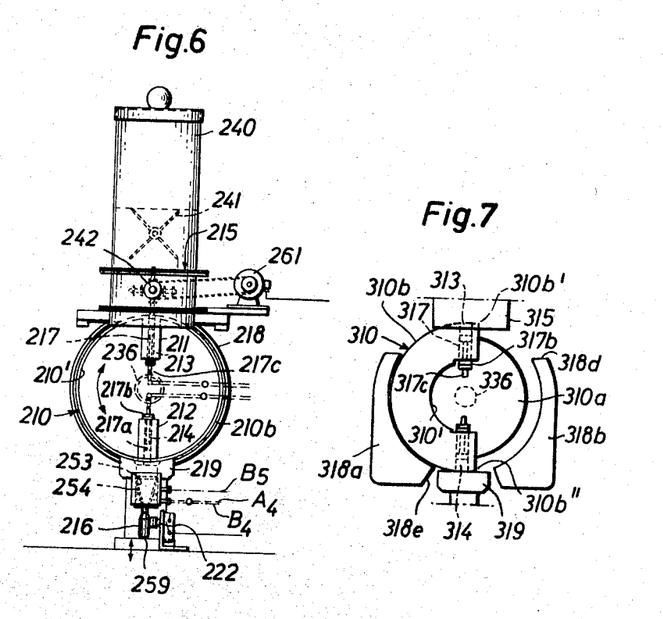
FIG. 6 is an end elevational view of a portion of the filling apparatus as seen from the right-hand side of FIG. 5.
FIG. 7 is an end elevational view of a further filling apparatus which comprises a hollow semicylindrical rotor.

Referring to FIGS. 5 and 6, there is shown a third filling apparatus which comprises a hollow cylindrical rotor 210 arranged to rotate about a horizontal axis and defining a cylindrical internal space 210' which replaces the cavity 11, 11a or 111, 111a and which accommodates two axially parallel chambered members in the form of bars 211, 212 which may but need not be integral with the rotor. These bars are respectively formed with rows of radially extending measuring chambers 213, 214 whose purpose is the same as that of the chambers 15a, 15b or $115a_1$–$115a_3$, $115b_1$–$115b_3$. The axes of the chambers 213, 214 are coplanar with the axis of the rotor 210. The chambers 213, 214 may receive pulverulent or like comminuted material through the underside of a magazine 215 and deliver measured quantities of such material into containers here shown as bottles 216 which are located at an evacuating station disposed at a level beneath the peripheral surface 210b of the rotor 210. In the embodiment of FIGS. 5 and 6, each of the bars 211, 212 is formed with two measuring chambers but it will be readily understood that each of these bars may be formed with three or more chambers and that the internal space 210' of the rotor 210 may accommodate one or more additional chambered bars without departing from the scope of my invention. However, it is important to arrange the bars and to select the diameter or the configuration of the internal space 210' in such a way that the inner end of each chamber 213, 214 (and of each additional chamber if the rotor comprises three or more bars) is readily accessible to facilitate adjustment of spindles 217 which correspond to the spindles 17 mentioned in connection with FIGS. 1 and 2. The right-hand end of the internal space 210', as viewed in FIG. 5, is open so that a mechanic may reach the spindles 217 with his fingers or with a suitable tool which serves to change the axial positon of the spindles and to thereby adjust the capacity of the respective measuring chambers. In other words, the mechanic should be in a position to also reach such spindles 217 which are nearest to the left-hand axial end of the rotor 210. The outer end portion of each spindle 217 carries a filter 217a and the inner end portion of each spindle carries a sealing washer 217b and a sleeve 217c. In the apparatus of FIGS. 5 and 6, the filters 217a consist of several layers of gas-permeable material with a very fine mesh of about 30,000 per cm.² The stacked layers provide a fluid permeable barrier to prevent pulverulent material from entering the suction channels which will be described later. Of course, it is obvious that the laminated filters 217a may be replaced by brushes 16 or by other types of a gas-permeable barriers which constitute satisfactory bottom walls for the material receiving outer portions of the measuring chambers 213, 214.

The peripheral surface of the rotor 210 is surrounded by a fixed shield in the form of an annulus 218 whose uppermost portion supports the underside of the magazine 215. The lowermost portion of the annulus 218 carries a filling member 219 which comprises two funnels 220, 223. An important function of the annulus 218 is to prevent entry of dust, moisture and other contaminating matter into the chambers 213, 214 or onto the exposed surface of the material which fills these chambers while the chambers move in an arc between the magazine 215 and the filling member 219. Thus, when the rotor 210 rotates about its horizontal axis, the outer ends of the chambers 213, 214 travel along the internal surface of the annulus 218 which thus constitutes an effective seal against entry of foreign matter into filled or unfilled measuring chambers. Of course, this annulus is formed with suitable apertures or cutouts which permit entry of solid material at the filling station and which permit evacuation of measured quantities of solid material at the discharging station. In other words, the apertures of the annulus 218 permit flow of material from the magazine 215 and into the chambers 213 as well as outflow of material from the chambers 214 and into a pair of funnels 220, 223 provided in the member 219 whenever the rotor 210 assumes the position of FIG. 6.

Two electric switches 221, 222 are respectively disposed at a level beneath the lower ends of the funnels 223, 220 in such a way that they may complete an electric circuit when a pair of empty containers 216 is in a position to recieve measured quantities of pulverulent or like material from the chambers 213 or 214. The switches 221, 222 are preferably connected in series so that the circuit is completed only if each of these switches is actuated by a bottle-like or otherwise shaped container. Referring to FIG. 6, the operator will have to insert a pair of containers 216 (one of these containers is located in front of the other) in a direction from the left to the right so that the containers actuate the respective switches in a fully automatic way as soon as they assume proper positions for reception of measured quantities of pulverulent or similar material. The circuit of the switches 221, 222 includes an electric motor 224 which serves to operate a control arrangement including a cam shaft 225 which carries a series of plate cams 226, 227, 228, 229, 230. This motor begins to rotate and then rotates through a predetermined angle only when each of the switches 221, 222 is actuated by the respective container 216. The cam 227 controls a switch 227a which is connected in the circuit of a reversible electric motor 231, and the output shaft of this motor 231 carries a pinion 232 forming part of a gear train which further includes gears 233, 234, 235 and which is arranged to drive the shaft 236 of the rotor 210. The gears 233, 234 are mounted on an intermediate shaft which is journalled in the main frame F' of the apparatus. The direction of rotation of the motor 231 is controlled by a pair of switches 237, 238 which are actuated by trips 237a, 238a mounted on the rotor shaft 236. The switches 237, 238 are respectively connected in circuit with switches 227a, 228a which are adjacent to the cam shaft 225 so as to be actuated by the cams 227, 228, respectively. Thus, when the switches 227a, 237 are actuated, the shaft 236 rotates in one direction, and when the switches 228a, 238 are actuated, the shaft 236 rotates in the opposite direction.

The material to be transferred is admitted first into a reservoir 240 which accommodates an upper agitator assembly 241 serving to deliver material into the magazine 215 which contains a second agitator assembly 242. The agitator assembly 242 is driven by an electric motor 261 which is shown in FIG. 6. The upper agitator assembly 241 is driven by a friction wheel 241a which cooperates with a second friction wheel 241b mounted on a horizontal shaft 243a which is driven by a sprocket 243. The sprocket 243 may be driven by the motor 261 or by a separate motor, not shown.

The suction generating system of the apparatus shown in FIGS. 5 and 6 includes a main section conduit A which is connected to the suction side of a vacuum pump 244, see FIG. 5. This main suction conduit A extends to a magnetic distributor valve 245 which opens automatically when the measuring chambers 213 or 214 are moved into material receiving position beneath the underside of the magazine 215. The main suction conduit A may communicate with a second suction conduit $A_1$ leading to an axially parallel channel 246 provided in the rotor shaft 236 and communicating with a radial duct 247 machined into the disk shaped left-hand end portion 210a of the rotor 210, reference being had to FIG. 5. This radial duct 247 communicates with the chambers 213 at points located radially inwardly of the respective filters 217a. The disk 210a is rigid with the remainder of the rotor 210, i.e., it shares all angular displacements of the shaft 236. When the chambers 213 are filled with material descending through the underside of the magazine 215, the rotor 210 is rotated through exactly 180 degrees so as to move the outer ends of the chambers 213 into registry with the funnels 220, 223 and to simultaneously move the open outer ends of empty chambers 214 into receiving position beneath the magazine 215. During such angular displacement of the rotor 210, the main suction conduit A may but need not remain in communication with the duct 247 and with the chambers 213 so that the material contained in these chambers may be retained by suction and by the internal surface of the annulus 218. Suction prevailing in the inner end portions of the chambers 213 then prevents the material from penetrating between the peripheral surface of the rotor 210 and the internal surface of the annulus 218 so that there is absolutely no loss in pulverulent material whereby the containers 216 may receive accurately measured doses of material which is of particular importance if the material is expensive. When the chambers 213 are moved into proper registry with the funnels 220, 223, the valve 245 has sealed the main suction conduit A from the second suction conduit $A_1$ so that the contents of the chambers 213 may descend by gravity and under the influence of blasts of compressed gaseous fluid which is then admitted through a main pressure conduit B connected to the outlet of a suitable compressor 248. The connection between the compressor 248 and the conduit B contains a suitable filter 249. The purpose of the filter 249 is to prevent entry of solid particulate or liquid impurities into the inner end portions of the chambers 213, 214.

The main pressure conduit B may communicate with a second pressure conduit $B_1$ through the valve 245 which is a multi-way distributor valve so that it connects the conduits B, $B_1$ when the main suction conduit A is disconnected from the second suction conduit $A_1$ or vice versa. The second pressure conduit $B_1$ is connected with the channel 246 and thus communicates with the radial duct 247 so that all material contained in the chambers 213 is expelled in a fully automatic way as soon as the outer ends of these chambers move into registry with the funnels 220, 223. These funnels convey the material into the respective containers 216 by gravity flow. Since the disk 210a is rigid with the remainder of the rotor 210, the duct 247 shares all angular movements of the chambers 213. Also, the duct 247 is in permanent communication with the channel 246 which, in turn, is in permanent communication with the ends of conduits $A_1$, $B_1$. Therefore, at least a portion of each of these conduits consists of flexible tubular stock to make sure that they can participate in angular displacements of the rotor 210 when the latter is caused to rotate in a clockwise or anticlockwise direction, always through 180 degrees.

The valve 245 is controlled by a switch 230a which cooperates with the cam 230.

The chambers 214 communicate with a radial duct 250 which is machined into the disk 210a and which communicates with an axially parallel channel 251 provided in the rotor shaft 236. The channel 251 is connected with a third suction conduit $A_2$ and with a third pressure conduit $B_2$. The conduits $A_2$, $B_2$ may communicate with the conduits A, B through a multi-way magnetic distributor valve 252 which is controlled by a switch 229a cooperating with the cam 229. At least a portion of each of the conduits $A_2$, $B_2$ consists of flexible tubular stock, i.e., these conduits may assume the form of pipes made of rubber or synthetic plastic. When the outer ends of the chambers 214 are located beneath the magazine 215, the third suction conduit $A_2$ communicates with the main suction conduit A but the third pressure conduit $B_2$ is sealed from the main pressure conduit B so that the material enters the chambers 214 by gravity flow and in response to suction generated by the pump 244. However, the situation is reversed when the outer ends of the chambers 214 move into registry with the funnels 220, 223, i.e., the cam 229 then causes the valve 252 to seal the third suction conduit $A_2$ from the main suction conduit A and to permit flow of compressed gas from the main pressure conduit B to the third pressure conduit $B_2$ so that blasts of compressed gas insure complete evacuation of material into the respective funnels and into the containers 216. Of course, the operator removes the filled containers from the evacuating station and places a pair of empty containers into receiving position in good time before a pair of filled chambers moves into registry with the funnels. As a matter of fact, and since the switches 221, 222 are actuated by empty containers, it is actually impossible to move a pair of filled chambers into registry with the funnels 220, 223 unless the lower ends of the funnels are properly aligned with open tops of two empty containers 216. In other words, the feature that the switches 221, 222 are actuated by the containers constitutes a safety measure and prevents unintentional spillage of measured quantities of material when the operator fails to place empty containers beneath the funnels. The rotor 210 is caused to rotate through 180 degrees in a clockwise direction when the operator places a first pair of empty containers 216 beneath the member 219, and the rotor automatically rotates in an anticlockwise direction (again through 180 degrees) when the operator removes the first pair of containers (which are now filled with solid material) and places a new pair of empty containers beneath the funnels 220, 223.

It is possible to construct the aforedescribed suction generating and pressure generating systems of the apparatus shown in FIGS. 5 and 6 in such a way that a pair of chambers 213 or 214 communicates with the suction conduit $A_1$ or $A_2$ as soon as the chambers leave the discharging station and begin to move toward the underside of the magazine 215. This would insure that any remnants of pulverulent material which might have adhered to the surfaces surrounding the material receiving portions of the chambers 213 or 214 will remain in the respective chambers while the rotor 210 rotates. However, this would also mean that suction prevailing in measuring chambers momentarily receiving material from the magazine 215 would be weaker, especially since the conduits $A_1$, $A_2$ are connected to a common vacuum pump 244. Therefore, I prefer to construct the apparatus of FIGS. 5 and 6 in such a way that suction is effective only at the time a pair of measuring chambers 213 or 214 reaches the magazine 215, at the time the chambers are being actually filled with material, and eventually at the time a pair of filled chambers moves downwardly toward the funnels 220, 223. Such operation is advisable because the annulus 218 can be machined with sufficient accuracy so that its internal surface effectively prevents escape of pulverulent material which might have remained in the chambers travelling upwardly from the funnels 220, 223 and toward the magazine 215. In fact, and when the ring 218 is machined with requisite precision, suction may be terminated as soon as a pair of chambers is properly filled with material which descends through the magazine 215 because the internal surface of the annulus 218 retains such batches of measured material in the respective chambers while the chambers descend toward the funnels. In other words, the provision of the annulus 218 renders it possible to connect the chambers 213, 214 with the vacuum pump 244 only at the time the chambers receive material from the magazine 215 without any danger that the apparatus would be contaminated with particles of material or that excessive quantities of material would go to waste.

The walls 253 of the funnels 220, 223 (whose number corresponds to the number of chambers 213 or 214) consist of several layers of gas permeable material which may be the same as that of the filters 217a. The mesh of the layers is selected in such a way that the walls 253 will retain all particulate matter but will permit passage of a gas which is being delivered by the pressure conduit $B_1$ or $B_2$ when the respective chambers reach the evacuating station. For example, the layers which form the walls 253 of the funnels 220, 223 may consist of perforated sheet steel or another suitable metallic material. It is also possible to use a porous ceramic substance or another form of gas permeable material. It is to be noted that the gas delivered through the conduits $B_1$, $B_2$ may but need not be air because the nature of the material which is being transferred into the containers 216 may be such that it should not come into contact with oxygen. Thus, the compressor 248 may deliver a stream of an inert gas such as is best suited for use in connection with a given pulverulent or otherwise comminuted material. As a rule, the material of the funnel walls 253 should be such that it may be readily sterilized if necessary.

The walls 253 are surrounded by annular gas-receiving spaces 254 of the filling member 219 which communicate with a further pressure conduit $B_5$ leading to the main pressure conduit B and containing an adjustable pressure reducing valve 255. The pressure of the gas passing through the discharge end of the conduit $B_5$ and into the annular spaces 254 is sufficiently low so that such gas may just penetrate through the walls 253 to separate from the inner sides of these walls any particles which might have adhered thereto and to insure that all such particles will descend into the respective containers. The provision of the pressure conduit $B_5$ is of considerable advantage when the material delivered by the chambers 213, 214 is of tacky consistency and tends to adhere to the internal surfaces of the walls 253. Such accumulations of material would reduce the quantity of material which actually descends into the containers, and this would result in inaccurate filling of containers.

As shown in FIG. 5, the pressure conduit $B_5$ may remain in permanent communication with the main pressure conduit B and with the pressure side of the compressor 248 so that the annular spaces 254 may be maintained under constant pressure and that such pressure always tends to separate particulate matter from the inner sides of the walls 253. Of course, it is equally possible to provide a suitable valve which regulates the flow of compressed gas into the conduit $B_5$ in such a way that the annular spaces 254 receive compressed gas only at the time the pressure conduits $B_1$, $B_2$ are disconnected from the compressor 248. Such valve is shown schematically by phantom lines and is identified by a reference numeral 255a. As a rule, the gas discharged by the pressure conduit $B_5$ will form a cushion along the inner sides of the walls 253 so that it might even prevent actual contact between these walls and the material which passes through the funnels 220, 223 and into the respective containers.

The lower portion of each of the funnels 220, 223 communicates with a further suction conduit $A_4$ and with a further pressure conduit $B_4$. These conduits are respectively connected with the main conduits A, B through a third magnetic distributor valve 256 which is controlled by a switch 226a cooperating with the cam 226. When the containers 216 are in proper position beneath the funnels 220, 223, their open tops are in sealing engagement with the underside of the filling member 219. To this end, the lowermost portion of the filling member comprises elastic rings 257, 258 of rubber or the like, and these rings form sealing washers around the necks of the containers 216. In order to remain in sealing engagement with the rings 257, 258, the containers 216 are placed onto a vertically reciprocable platform 259 (see FIG. 6) which tends to move the containers upwardly and toward the underside of the filling member 219. For example, the platform may be mounted on suitable springs which bias its upper portion toward the filling member. The arrangement is such that the containers actuate the switches 221, 222 and thereupon move upwardly under the action of the platform 259. Thus, the interior of each container 216 is at least partially but preferably rather accurately sealed from the atmosphere and communicates only with the interior of the respective funnel.

When a pair of filled chambers reach the filling member 219, the conduit $A_4$ communicates with the main suction conduit A via valve 256 so that the interior of the funnels 220, 223 and the interior of each container 216 is maintained at subatmospheric pressure whereby the material contained in the filled chambers is compelled to descend into the funnels and to flow into the containers. Of course, the intake end of the suction conduit $A_4$ contains a suitable filter which prevents entry of solid material so that only gaseous fluid is evacuated when the valve 256 connects the conduit $A_4$ with the main suction conduit A. It is to be noted that the pressure conduit $B_5$ communicates with the annular spaces 254 whereas the conduits $A_4$, $B_4$ preferably communicate directly with the interior of the funnels 220, 223. Upon complete or nearly complete evacuation of the chambers 213 or 214, the valve 256 permits the pressure conduit $B_4$ to send a blast of compressed gas into the funnels 220, 223 in order to prevent bridging of solid material and to completely loosen any such material which might adhere to the walls 253 despite the fact that the conduit $B_5$ supplies a continuous stream of gas into the annular spaces 254 at a pressure which exceeds only slightly the atmospheric pressure. The valve 256 seals the conduit $A_4$ from the main suction conduit A when the conduit $B_4$ communicates with the main pressure conduit B, and the arrangement of cams on the shaft 225 is such that the suction conduit $A_4$ draws gases from the funnels 220, 223 and from the interior of the containers 216 at the time the conduit $B_1$ or $B_2$ delivers a short blast of gas through the radial channel 247 or 250, depending upon which of the chambers 213, 214 are momentarily aligned with the funnels.

In accordance with a preferred embodiment of the apparatus shown in FIGS. 5 and 6, each annular space 254 contains a horizontal sealing partition 260 which seals the upper zone of each annular gas-receiving space 254 from the lower zone thereof. Thus, since the pressure conduit $B_5$ communicates with the upper zones of the annular spaces 254 (above the partitions 260), the lower zones of these spaces do not receive compressed gas from the conduit $B_5$ but solely from the conduit $B_4$ when the latter is free to communicate with the main pressure conduit B. The suction conduit $A_4$ passes through the lower zones of the annular spaces 254 and into the funnels 220, 223.

It will be readily understood that each of the pairwise arranged conduits $A_1$–$B_1$, $A_2$–$B_2$ and $A_4$–$B_4$ may be replaced by a single conduit without in any way departing from the spirit of my invention. Thus, the valve 245 may be connected with a flexible conduit which replaces the conduits $A_1$, $B_1$ and which is adapted to convey compressed gas when it communicates with the main pressure conduit B or to withdraw gas from the channel 246 when it is free to communicate with the main suction conduit A.

The filling member 219, the annulus 218, the control system including the camshaft 225 with its cams, the motor 231, the various switches and valves as well as certain other elements of the filling apparatus shown in FIGS. 5 and 6 may be utilized in the apparatus of FIGS. 1 and 2 or in the apparatus of FIG. 4.

FIG. 7 illustrates a portion of a fourth filling apparatus wherein the rotor 310 assumes a semicylindrical shape to form a semicylindrical internal space 310' and wherein the radial width of the rotor is sufficient to accommodate two rows of measuring chambers 313, 314 which are arranged in the same way as the rotor 210 of FIGS. 5 and 6. The rotor 310 is rotatable back and forth about the horizontal axis of a shaft 336 so as to move the rows of chambers 313, 314 between a magazine 315 and a filling member 319. The annulus 218 is replaced by a two-piece shield 318a, 318b which prevents spillage of material while the rotor turns alternatively in a clockwise and anticlockwise direction. It will be noted that the internal space 310' a portion of which surrounds the axis of the rotor 310 is dimensioned in such a way that the sealing washers 317b and the sleeves 317c on all of the spindles 317 are readily accessible. If desired, the rotor 310 may be formed with three or more rows of measuring chambers. The disk 310a at the rear axial end of the rotor is formed with ducts (not shown) which may be connected with a vacuum pump or with a compressor in the same way as described in connection with FIGS. 5 and 6.

The open ends of the chambers 313, 314 are adjacent to the axially parallel edge portions 310b', 310b'' of the peripheral surface 310b of the rotor 310. The gaps 318d, 318e constitute openings in the composite shield 318a, 318b so that pulverulent material may enter the chambers 313, 314 by flowing through the opening 318d and that the material may be evacuated from the chambers by flowing through the opening 318e.

The rotor 310 of FIG. 7 bears a strong resemblance to the rotor 10 of FIGS. 1 and 2 because the internal space 310' is obviously analogous to the cutout 11, 11a.

Figure 8:
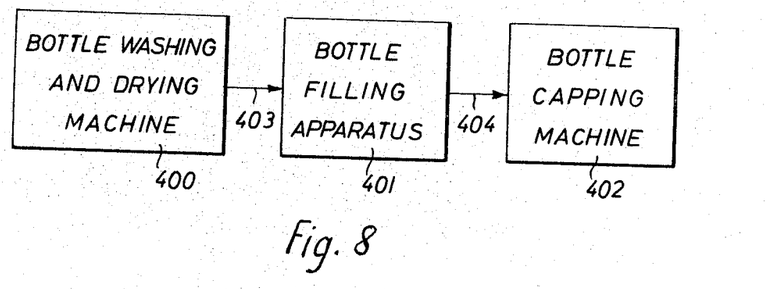
FIG. 8 is a schematic diagram showing the filling apparatus of my invention in a plant wherein the apparatus receives containers from a washing and drying machine and delivers them to a capping machine in a fully automatic way.

Referring finally to FIG. 8, there is shown a diagram representing a series of machines in a bottling plant wherein a washing, drying and sterilizing machine 400 automatically feeds rows of bottles or other types of empty containers to a bottle filling apparatus 401 of the type described in connection with FIGS. 1 to 7, and wherein this apparatus automatically delivers rows of filled containers to a sealing or capping machine 402. In other words, the arrangement shown in FIG. 8 delivers rows of empty containers to and withdraws rows of filled containers from the filling apparatus 401 of my invention in a fully automatic way. The means for automatically delivering and withdrawing containers from the filling apparatus 401 comprises suitable conveyors 403, 404 whose exact construction forms no part of this invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An apparatus for transferring measured quantities of pulverulent material from a source of such material to an evacuating station, comprising a rotor having a cutout including a sector shaped first section and an axially extending second section, a peripheral surface, and at least one axially parallel row of measuring chambers each having an open end at said peripheral surface and each extending radially inwardly toward said second section; a plurality of manually actuable adjusting means mounted in said rotor and each associated with one of said measuring chambers and including an adjusting portion adjustably arranged in the respective measuring chamber and an actuating portion located in said second section of said cutout, said actuating portions arranged in said second cutout section spaced from each other in axial direction thereof and accessible through said sector-shaped first cutout section for manual actuation thereof; and drive means for oscillating said rotor back and forth between a plurality of angularly spaced positions in one of which the open ends of said chambers are located at the source and in another of which the open ends of said chambers are located at an evacuating station.

2. An apparatus for transferring measured quantities of pulverulent material from a source of such material to an evacuating station, comprising a rotor having a cutout including a sector shaped first section and an axially extending second section, a peripheral surface, and two axially parallel rows of measuring chambers each having an open end at said peripheral surface and each extending radially inwardly toward said second section, said rows of chambers being adjacent to and being separated from each other by said first section; two sets of manually actuable adjusting means mounted in said rotor, each of said sets of adjusting means corresponding and co-operating with one of said rows of chambers, and each adjusting means associated with one of said measuring chambers and including an adjusting portion adjustably arranged in the respective measuring chamber and an actuating portion located in said second section of said cutout, said actuating portions arranged in said second cutout section spaced from each other in axial direction thereof and accessible through said sector-shaped first cutout section for manual actuation thereof; and drive means for oscillating said rotor back and forth between a plurality of angularly spaced positions in one of which the open ends of one row of chambers are adjacent to the source while the open ends of the other row of chambers are adjacent to the evacuation station and in another of which the open ends of said one row of chambers are adjacent to the evacuating station while the open ends of said other row of chambers are adjacent to the source.

3. An apparatus for transferring measured quantities of pulverulent material from a source of such material to an evacuating station, comprising a rotor having a cutout including a sector shaped first section and an axially extending second section, a peripheral surface, and two axially parallel rows of measuring chambers each having an open end at said peripheral surface and each extending radially inwardly toward said second section, said rows of chambers being adjacent to and being separated from each other by said first section; two sets of manually actuable adjusting means mounted in said rotor, each of said sets of adjusting means corresponding and co-operating with one of said rows of chambers, and each adjusting means associated with one of said measuring chambers and including an adjusting portion adjustably arranged in the respective measuring chamber and an actuating portion located in said second section of said cutout, said actuating portions arranged in said second cutout section spaced from each other in axial direction thereof and accessible through said sector-shape first cutout section for manual actuation thereof; and drive means for oscillating said rotor back and forth between a plurality of angularly spaced positions in one of which the open ends of one row of said chambers are located at the source and in another of which the open ends of said one row of chambers are located at the evacuating station; suction generating means arranged to maintain said chambers at subatmospheric pressure while the chambers are adjacent to the source so that the material is drawn into the respective chambers, and a source of compressed gas arranged to expel material from said chambers when the chambers are adjacent to the evacuating station.

4. An apparatus for transferring measured quantities of pulverulent material from a source of such material to an evacuating station, comprising a rotor having an internal space extending in axial direction of said rotor and a cutout extending also in said axial direction from the peripheral surface of said rotor to said internal space, a peripheral surface, and a plurality of axially parallel rows of measuring chambers each having an open end at said peripheral surface and each extending radially inwardly toward said internal space, said rows being disposed in two angularly spaced series of parallel rows; two sets of manually actuable adjusting means mounted in said rotor, each of said sets of adjusting means corresponding to one of said rows of measuring chambers, and each of said adjusting means associated with one of said measuring chambers and including an adjusting portion adjustably arranged in the respective measuring chamber and an actuating portion located in said internal space, said actuating portions being arranged in said internal space spaced from each other in said axial direction and accessible through said cutout for manual actuation thereof; and drive means for oscillating said rotor back and forth between a plurality of angularly spaced positions in one of which the open ends of one row in one of said series are adjacent to the source while the open ends of one row in the other series are adjacent to the evacuating station and in another of which the open ends of said one row in said one series are adjacent to the evacuating station while the open ends of said one row in said other series are adjacent to the source.

5. An apparatus for filling bottles or similar containers with measured quantities of comminuted material, comprising a rotor arranged to rotate about a horizontal axis and having a peripheral surface provided with two spaced axially parallel rows of measuring chambers, each of said chambers having an open end at and extending substantially radially inwardly from said peripheral surface; a source of comminuted material located above said rotor and having an underside through which the material may descend by gravity; a row of funnels located at a level below said rotor and arranged to convey measured quantities of comminuted material from one row of chambers at a time into containers which are located therebelow; drive means arranged to oscillate said rotor back and forth between a plurality of angularly spaced positions in one of which the open ends of chambers in one of said rows are located beneath the underside of said source while the open ends of chambers in the other row are located above and register with said funnels and in another of which the open ends of chambers in said one row register with said funnels while the open ends of chambers in said other row are located beneath the underside of said source; a suction generating device arranged to draw comminuted material by suction into that row of chambers whose open ends are adjacent to the underside of said first mentioned source; a source of compressed gas arranged to expel material from that row of chambers whose open ends register with said funnels; a filling member surrounding said funnels and defining a gas-receiving space around each funnel, said filling member comprising sealing partitions dividing each of said gas-receiving spaces into an upper zone and a lower zone; first conduit means connecting the upper zones of said gas-receiving spaces with said source of compressed gas, at least a portion of each of said funnels consisting of gas-permeable material so that a gas admitted into the upper zones of said gas-receiving space passes through and separates comminuted material from said funnels; and second conduit means connecting said suction generating device with the lower zones of said gas-receiving spaces so as to draw the material into the funnels by evacuating air from the funnels and from the respective containers while the material flows from a row of chambers into the funnels.

6. An apparatus as set forth in claim 5, wherein said first mentioned conduit means comprises a pressure reducing valve to maintain the gas pressure in said upper zones at slightly above atmospheric pressure, and further comprising conduit means connecting the lower zones of said gas-receiving spaces with said source of compressed gas so that gas at high pressure may be admitted at predetermined intervals to loosen up the material in said funnels.

7. An apparatus as set forth in claim 5, further comprising sealing washers arranged to provide fluidtight seals between said funnels and the open ends of containers placed therebeneath.

8. An apparatus as set forth in claim 5, wherein at least a portion of each of said funnels consists of filter material with a mesh of about 30,000 per cm.$^2$.

9. An apparatus as set forth in claim 5, wherein each of said rows comprises two chambers and wherein each of said chambers has a bottom wall distant from the peripheral surface of said rotor and constituting a filter with a mesh of about 30,000 per cm.$^2$.

10. An apparatus as set forth in claim 5, wherein said drive means includes a reversible electric motor and further comprising switch means connected in circuit with said motor and actuated by containers placed beneath said funnels so as to start the motor in response to placing of empty containers beneath said funnels.

11. An apparatus as set forth in claim 10, wherein said switch means comprises a plurality of switches each actuatable by one container, said switches being connected in series so that said motor is started only when an empty container is properly located beneath each of said funnels.

References Cited

UNITED STATES PATENTS

| | | |
|---|---|---|
| 941,024 | 11/1909 | Mantius. |
| 1,712,775 | 5/1929 | Mudd _____________ 222—277 X |
| 2,540,059 | 1/1951 | Stirn et al. _________ 222—368 X |
| 2,907,357 | 10/1959 | Sandhage et al. ______ 141—59 |
| 2,891,298 | 4/1961 | Vogt _______________ 141—5 |
| 3,067,786 | 12/1962 | Rosen ___________ 141—160 X |
| 3,211,190 | 10/1965 | Vogt _______________ 141—5 |

FOREIGN PATENTS 680,126 10/1952 Great Britain.

LAVERNE D. GEIGER, *Primary Examiner.*

E. J. EARLS, *Assistant Examiner.*